Figure 1:
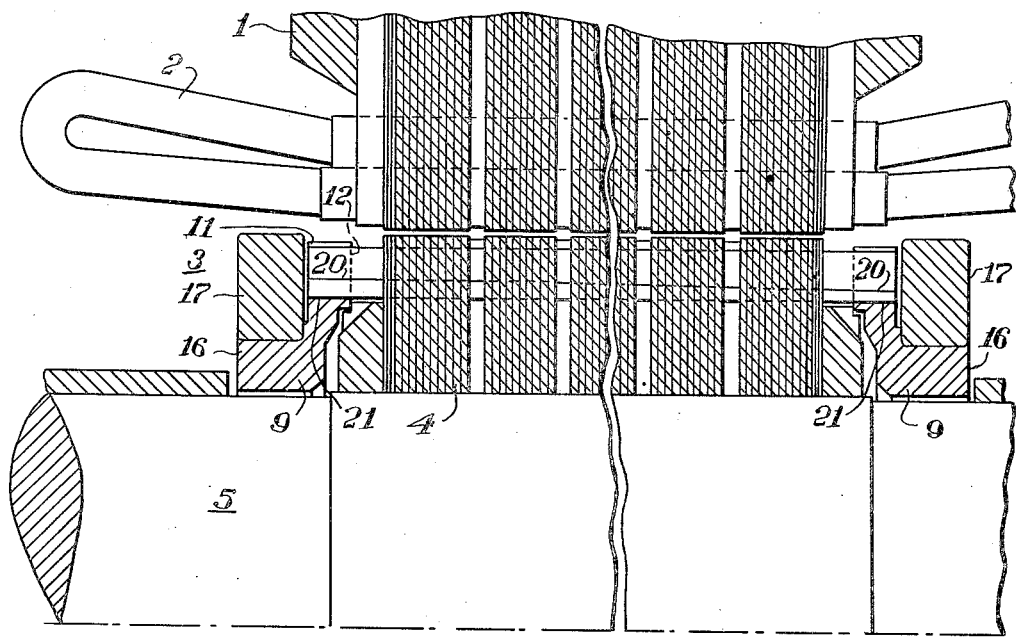

May 7, 1940.  P. C. SMITH  2,200,126

DAMPER BAR

Filed July 16, 1938

WITNESSES:
Edward Michaels
Bernard L. Zangwill

INVENTOR
Philip C. Smith.
BY O. B. Buchanan
ATTORNEY

Patented May 7, 1940

2,200,126

UNITED STATES PATENT OFFICE 2,200,126

DAMPER BAR

Philip C. Smith, Edgewood, Pa., assignor to Westinghouse Electric & Manufacturing Company, East Pittsburgh, Pa., a corporation of Pennsylvania Application July 16, 1938, Serial No. 219,515

7 Claims. (Cl. 172—120)

My invention relates to dynamo-electric machines, and has particular application to high power, high speed squirrel-cage induction motors employed in a service requiring frequent starting and high starting torque. In such service, the electric power supplied at starting must not only overcome the reaction of the load, but must also overcome the inertia of the rotor and other rotatable parts in bringing them up to speed at the desired rate of acceleration.

It is well known that the starting torque of the induction motor is a function of the resistance of the damper winding, and it is customary to employ some expedient which will offer a high resistance at starting, thereby resulting in a high starting torque and a lower resistance during normal running conditions for more desirable running characteristics. Where the peripheral speeds are high or the cross-section of the rotor is large, bars of a trapezoidal cross-section are particularly suitable for the damper winding of the cage and offer considerable advantages with respect to mechanical and electrical characteristics of the motor. During starting, the eddy current effect due to the difference in frequency between the rotating field and the rotor speed forces the currents in the damper bars outward toward the rotor circumference where the cross-section of the bar is least and its resistance highest. As normal running speeds are approached, the current distributes itself with more uniform density throughout the bar, thereby offering a lower running resistance. These characteristics fulfill the requirements for high starting torque for an induction motor to an exceptionally satisfactory degree and with little, if any, objectionable features during normal running condition.

One difficulty encountered in the use of wedge-shaped damper bars has been the difficulty of assembling and securing the bars in the wedge-shaped slots provided in the rotor for the purpose.

It is, accordingly, an object of my invention to provide a method of assembling wedge-shaped damper bars in a rotor which is accomplished with ease and economy, and which results in a bar mechanically tight in its slot.

It is another object of my invention to provide a means for improving the retention of the damper bars into the rotor core slots of a squirrel-cage motor and of particular adaptation to wedge-shaped bars, although not necessarily limited thereto.

In motors of the type described, the currents at starting are higher than the running currents, and the resistance offered to the starting currents are also higher with the result that the amount of the heat generated must be adequately dissipated for an efficient motor.

It is, accordingly, still another object of my invention to secure the damper bars in the motor core slots to provide intimate contact between the surfaces of the two and in this way improve the conduction of heat from the bars to the iron of the rotor. Such construction necessarily results in a motor of improved efficiency and higher rating.

In general, the many advantages of my construction are obtained from the use of a main conductor bar which is tapered longitudinally, that is, in the direction of the length of the slot. By inserting a second auxiliary bar in the slot beneath the main bar, the latter is forced upward into intimate contact with the sides of the slot. The auxiliary bar has a taper corresponding to that of the main bar, but in an opposite direction, and by this expedient I am able to apply force to the main bar upwardly along substantially its entire length. I have found that I can obtain a much greater intimacy of contact between the main bar and the slot sides than has heretofore been possible to my knowledge, and with an obviously better rate of heat conduction from the bar to the iron core of the rotor.

Figure 2:
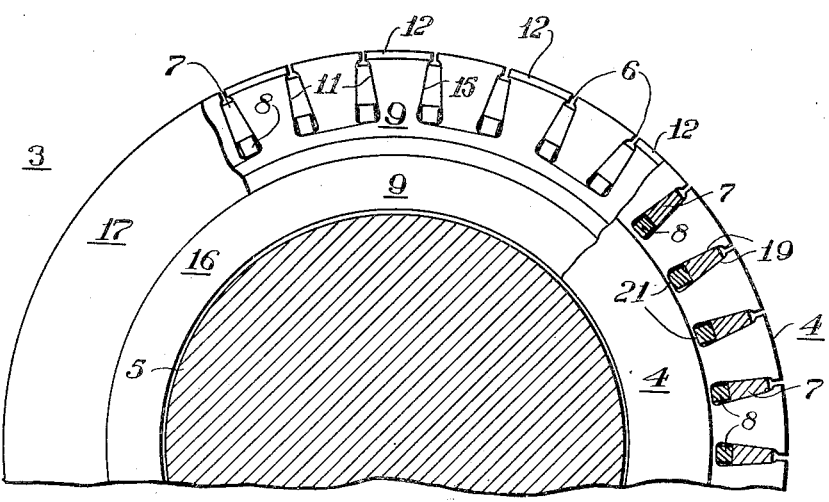

Other objects of my invention not specifically mentioned above will be apparent from the accompanying description taken in conjunction with the drawing, wherein:

Figure 1 is a longitudinal sectional view of part of a squirrel-cage motor embodying my invention; and Fig. 2 is an end view of the rotor member, with parts broken away to show the construction.

My invention is shown applied to a large high speed three-phase induction motor comprising a stator member 1 having primary windings 2 thereon, and a rotor member 3 comprising a rotor core 4 mounted on a shaft 5, the outer periphery of the rotor core being provided with substantially longitudinally extending slots 6 for receiving squirrel-cage or damper bars 7 and 8, subsequently to be described in more detail.

Each slot 6 contains a pair of these damper bars 7 and 8, the ends of which are secured to properly constructed copper end rings 9, the periphery of each of which is provided, in effect, with approximately radially disposed notches 11 separated by approximately radially projecting teeth 12. There are twice as many slots 6 as there are teeth 12. According to my invention, in the final assembly the opposite sides of the bars of two adjacent slots are brazed to the adjoining sides of one of said teeth 12 in each of the end rings 9, the brazed joint being made between the appropriately radially disposed flat sides of the pair of bars in each slot and the corresponding side of one of the teeth 12, as indicated at 15; and if desired, the bottoms of the bars 7 and 8 may be brazed and the bottom of the lower bar 8 may also be brazed to the bottoms of the notch 11. The damping means 9 are given an angular cross-section, as shown in Fig. 1, including a cylindrical shoulder 16 disposed at the inner periphery of the ring and extending axially outward therefrom. The outer periphery of this cylindrical shoulder 16 is tightly engaged by a massive weldless-steel banding-ring or shrink-ring 17 which is shrunk onto the cylindrical shoulder 16.

The above-described assembly embracing the end damping rings 9 and shrink rings 17 follows the general principles disclosed in greater detail and claimed in the application of Rene A. Baudry, Serial No. 210,189, filed May 26, 1938, and assigned to the Westinghouse Electric & Manufacturing Company. The features of my invention relate primarily to an improvement in the damper bar assembly and design within the slots 6.

It may be observed from Fig. 2 that the slots 6 each are trapezoidal in radial outline, with the narrower side toward the periphery of the rotor, and that the outer bar 7 has a taper corresponding to that of the upper portion of the slot. However, the depth of the bar 7 is somewhat less than that of the slot 6, thereby providing a space for the lower bar 8. The upper bar 7 fully occupies its portion of the slot 6 and is forced into contact with the sides 19 of the slot by a taper provided on the bars 7 and 8. This taper follows along the line 20 of Fig. 1 and is shown as a longitudinal taper.

In the initial assembly of the bars in the rotor core, the bar 7 may be slid into the slot in the lower portion of the last. In this way the bar 7 readily enters the slot since the latter is wider than the bar 7 at the bottom portion of the slot. After the bar has been longitudinally aligned in the slot, the bar 8 may be inserted and will readily enter the space between the bottom 21 of the slot and the bottom of the bar 7 until it reaches a position where its upper surface contacts the lower surface of the bar 7 along substantially the full length of the two bars. Further insertion of the bar 8 will create a wedging pressure forcing the bar 7 upward and tightly against the sides of the slot 6. In other words, the wedge-shaped bar 7 is inserted into slot 6 without the insertion of appreciable force of any kind, but is then tightly wedged in the slot 6 by means of the axial wedge 8. This method of wedging keeps the bars rigidly in place in the core and assures a uniform intimate contact between the sides of the bar 7 and the adjoining sides of the slot 6 as well as between the bottom of the bar 8 and the bottom of the slot. This results in a mechanically rigid rotor for high speed operation, and further permits a high heat flow from the damper bars which may be copper to the iron of the rotor.

To further facilitate the ease of assembly of the bars in the rotor slots, I prefer to make the cross-section of the bar 8 narrower in a circumferential direction than that portion of the slot it normally would occupy. This is more clearly indicated in Fig. 2. In this figure the bar 8 is shown as having a substantially square cross-section, and it may be observed that there is clearance between each of the radially disposed sides of the bar and the adjacent sides of the slot 6. With this clearance, there is no binding between the sides of the slot and bar 8 when the latter is wedged in place. In actual construction, I prefer to make the bars 7 and 8 somewhat longer than the required length, machining them off to size after they have been wedged secure in the slot and brazed to the end rings 9, but before the shrinking thereon of the ring 17. The extra length of the bars eliminates the requirement for alignment with the ends of the rotor and assures that both will be tight in the slot along the entire length thereof, the superfluous protruding ends being machined off later in the assembly.

The relative depths, radially of the bars, will depend largely upon the characteristic desired of the machine, but I prefer to make the lower bar 8 of considerable lesser depth than the upper bar 7 so that the higher heating occurring during starting of the motor will be in the outer parts of the bar 7 and will not be completely transmitted to the lower bar. I have found that this construction has marked advantages for a motor undergoing frequent starting and rapid acceleration.

As a result of the above-described constructions, it will be observed that I have provided a method for easily and economically securing damper bars in the rotor member of a squirrel-cage motor, resulting in a high mechanical rigidity for opposing centrifugal disrupting forces, and also disruptive thermally-created forces. It will further be observed that I have increased the heat conduction from the damper bars to the iron of the rotor core, thereby resulting in a more efficient motor, particularly when the motor is to be used for frequent starting with rapid acceleration. Although the damper bars and end rings are preferably copper, I desire to be understood that any or all may be of some substance, other than copper, that has the necessary electrical properties for furnishing the desired operating characteristics for the motor.

While I have illustrated my invention in a preferred form of embodiment, and have described the same in connection with a preferred method of carrying out the invention, it will be obvious that such illustration and description should be taken only by way of illustration and not by way of limitation of the invention. I desire, therefore, that the appended claims shall be accorded the broadest scope counsistent with their language and the prior art.

I claim as my invention:

1. A dynamo-electric machine preferably of the squirrel-cage induction type having a rotor member with substantially longitudinal slots and main damper bars therein, the slots being generally formed with sides outwardly converging, and the damper bars of the same general cross-section, but of lesser depth, and an additional wedge bar for each of said slots interposed between the bottom of the slot and the contained main damper bar forcing the last said main damper bar into intimate contact with the said converging sides of the slot, said wedge bar being circumferentially narrower than the portion of the slot it occupies, and the depth of the said main damper bars at all points axially along their length being considerably in excess of that of the said wedge bars.

2. A dynamo-electric machine preferably of the squirrel-cage induction type having a rotor member with substantially longitudinal slots and main damper bars therein, the sides of each slot being converging outwardly, and the associated damper bar therefor being of the same general cross-section but of lesser depth, the bottom of the bar also being tapered longitudinally, and an additional bar interposed between the bottom of the slot and the contained damper bar and tapering longitudinally substantially to correspond to that of the said associated damper bar but in an opposite direction whereby the two bars react to force the said associated damper bar into intimate contact with the said sides of the slot, said additional bar being relatively of considerably lesser depth than the said damper bar at all points axially along said additional bar.

3. A dynamo-electric machine preferably of the squirrel-cage induction type having a rotor member with substantially longitudinal slots and main damper bars therein, the sides of each slot being tapered outwardly, and the associated damper bar therefor is of the same general cross-section but of lesser depth, the bottom of the bar also being tapered longitudinally, and an additional bar interposed between the bottom of the slot and the contained damper bar and tapering longitudinally substantially to correspond to that of the said associated damper bar but in an opposite direction whereby the two bars react to force the said associated damper bar into intimate contact with the said tapered sides of the slot, said additional bar being of considerably lesser depth at all points axially along its length than said associated damper bar.

4. A dynamo-electric machine preferably of the squirrel-cage induction type having a rotor member with substantially longitudinal slots and main damper bars therein, the sides of each slot being tapered outwardly, and the associated damper bar therefor is of the same general cross-section but of lesser depth, the bottom of the bar also being tapered longitudinally, and an additional bar interposed between the bottom of the slot and the contained damper bar and tapering longitudinally substantially to correspond to that of the said associated damper bar but in an opposite direction whereby the two bars react to force the said associated damper bar into intimate contact with the said tapered sides of the slot, said additional bar having a depth considerably less at all points axially along it than that of the said associated damper bar, and having a rectangular cross-section.

5. A dynamo-electric machine preferably of the squirrel-cage induction type having a rotor member with substantially longitudinal slots and main damper bars therein, the slots being generally formed with sides outwardly converging, and the damper bars of the same general cross-section, but of lesser depth, and an additional wedge bar for each of said slots interposed between the bottom of the slot and the contained main damper bar forcing the last said main damper bar into intimate contact with the said converging sides of the slot, the depth of the last said main damper bar at all points axially along its length being considerably in excess of that of the last said wedge bar.

6. A dynamo-electric machine preferably of the squirrel-cage induction type having a rotor member with substantially longitudinal slots and main damper bars therein, in which the sides of each of said slots are tapered outwardly, and the damper bar therefor is of the same general cross-section but of lesser depth, and an additional bar is interposed between the bottom of the slot and the contained damper bar wedging the last said damper bar into intimate contact with the said tapered sides of the slot, said additional bar being circumferentially narrower than the portion of the slot it occupies, and being relatively of considerably less depth than the said damper bar at all points axially along said additional bar.

7. A dynamo-electric machine preferably of the squirrel-cage induction type having a rotor member with substantially longitudinal slots and main damper bars therein, the slots being generally formed with sides outwardly converging, and the damper bars of the same general cross-section, but of lesser depth, and an additional wedge bar for each of said slots interposed between the bottom of the slot and the contained main damper bar forcing the last said main damper bar into intimate contact with the said converging sides of the slot, said wedge bar being circumferentially narrower than the portion of the slot it occupies, and having a rectangular cross-section, said damper bars being of a depth axially along their length considerably in excess of said wedge bars.

PHILIP C. SMITH.